(12) United States Patent
Killalea (10) Patent No.: US 8,356,248 B1
(45) Date of Patent: Jan. 15, 2013

(54) GENERATING CONTEXT-BASED TIMELINES

(75) Inventor: Tom Killalea, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 1113 days.

(21) Appl. No.: 12/240,824

(22) Filed: Sep. 29, 2008

(51) Int. Cl.
*G06F 17/00* (2006.01)

(52) U.S. Cl. ........ 715/273; 715/234; 715/255; 715/200; 707/751

(58) Field of Classification Search .................. 715/273, 715/255, 200, 206, 229, 234; 707/749, 751
See application file for complete search history.

(56) References Cited

U.S. PATENT DOCUMENTS

| | | | |
|---|---|---|---|
| 6,600,501 B1 * | 7/2003 | Israel et al. ................... 715/810 |
| 2004/0205515 A1 * | 10/2004 | Socolow et al. ........... 715/501.1 |
| 2005/0055625 A1 * | 3/2005 | Kloss ........................ 715/500.1 |
| 2007/0061759 A1 * | 3/2007 | Klein, Jr. ...................... 715/853 |
| 2007/0179977 A1 * | 8/2007 | Reed et al. ................. 707/104.1 |
| 2008/0077846 A1 * | 3/2008 | Sako et al. ..................... 715/227 |
| 2008/0189634 A1 * | 8/2008 | Tevanian et al. .............. 715/764 |
| 2008/0294663 A1 * | 11/2008 | Heinley et al. ................ 707/100 |
| 2009/0241048 A1 * | 9/2009 | Augustine et al. ............ 715/769 |
| 2009/0249223 A1 * | 10/2009 | Barsook et al. ............... 715/753 |
| 2009/0254836 A1 * | 10/2009 | Bajrach ........................ 715/745 |
| 2010/0199192 A1 * | 8/2010 | Sittig et al. ................... 715/751 |
| 2011/0119613 A1 * | 5/2011 | Zhu et al. ..................... 715/771 |

* cited by examiner

*Primary Examiner* — Thu Huynh (74) *Attorney, Agent, or Firm* — Knobbe Martens Olson & Bear LLP (57) ABSTRACT

Context-based timelines can be generated for an item in an electronic catalog by extracting contextual terms and item events corresponding to the item. The contextual terms can be used to retrieve historical data on historical events from a data repository. The historical data can be associated with at least some of the contextual terms. A context-based timeline can be generated that includes at least some of the historical events. The context-based timeline can be output for presentation to one or more users.

18 Claims, 7 Drawing Sheets

GENERATING CONTEXT-BASED TIMELINES

BACKGROUND

Electronic commerce is an increasingly popular way of selling products and services, referred to herein collectively and interchangeably as items, to consumers. Activities of electronic commerce typically, but not exclusively, include browsing for items to purchase; comparing various aspects such as price, color, warranties, and the like of items for purchase; inspecting product details of an item; purchasing one or more items; and the like. The popularity of electronic commerce (sometimes referred to as "e-commerce") has prompted more vendors to make their products and services available over electronic networks, such as the Internet, and computer users have correspondingly embraced electronic commerce as a legitimate shopping environment.

Items that have background information or tell stories—such as books, movies, and television shows—are often popular sellers in electronic commerce and traditional commerce. Examples of such items include books, movies, television shows, and the like. These items may presume a certain amount of background knowledge on the part of the user or viewer.

DETAILED DESCRIPTION

While exploring content (such as books, movies, and the like), a user may come across contextual information including characters, events, and places that relate directly or indirectly to subject matter of the content. Often the author of the content may forego explaining this contextual information. For a user who does not have this background, the content may be less enjoyable. Additionally, users may wish to acquire additional contextual information as part of the content explanation.

In certain embodiments, systems and methods are provided for generating context-based timelines for items, such as books, movies, television shows, or other pieces of content. The context-based timelines can include events described by items and can also include historical events. In certain embodiments, the context-based timelines are output as part of a display to a user in response to a user request to view a context-based timeline. The context-based timelines may help users place unfamiliar events in the context of historical events. In addition, in certain embodiments, context-based timelines can be used to compare items and to recommend items.

As used herein, the term "item" is used interchangeably to refer to an item itself (e.g., a particular product or service) and to its description or representation in an electronic catalog system. As will be apparent from the context in which it is used, the term is also sometimes used herein to refer only to the item itself or only to its representation in the catalog system. Likewise, specific items such as "books," "movies," and "television shows" are used interchangeably to refer to the respective items themselves and to their description or representation in an electronic catalog system.

For purposes of illustration, the methods or processes disclosed herein are described primarily in the context of a network resource such as a web site. However, the disclosed processes need not be implemented as part of, or in conjunction with, a web site. For example, the processes described herein can be implemented as one or more applications on any processor-based system. In addition, for ease of illustration, the context-based timelines disclosed herein are described primarily in the context of books. However, the systems and methods herein may also be used to generate context-based timelines for movies, television shows, magazines, video games, music, and other items.

These systems and methods will now be described with reference to the drawings summarized above. Throughout the drawings, reference numbers may be re-used to indicate correspondence between referenced elements. The drawings, associated descriptions, and specific implementation are provided to illustrate embodiments of the inventions described herein and not to limit the scope thereof.

In addition, methods and processes described herein are not limited to any particular sequence, and the blocks or states relating thereto can be performed in other sequences that are appropriate. For example, described blocks or states may be performed in an order other than that specifically disclosed, or multiple blocks or states may be combined in a single block or state. Moreover, the various modules of the systems described herein can be implemented as software applications, hardware and/or software modules, or components on one or more computers, such as servers. While the various modules are illustrated separately, they may share some or all of the same underlying logic or code.

Figure 1:
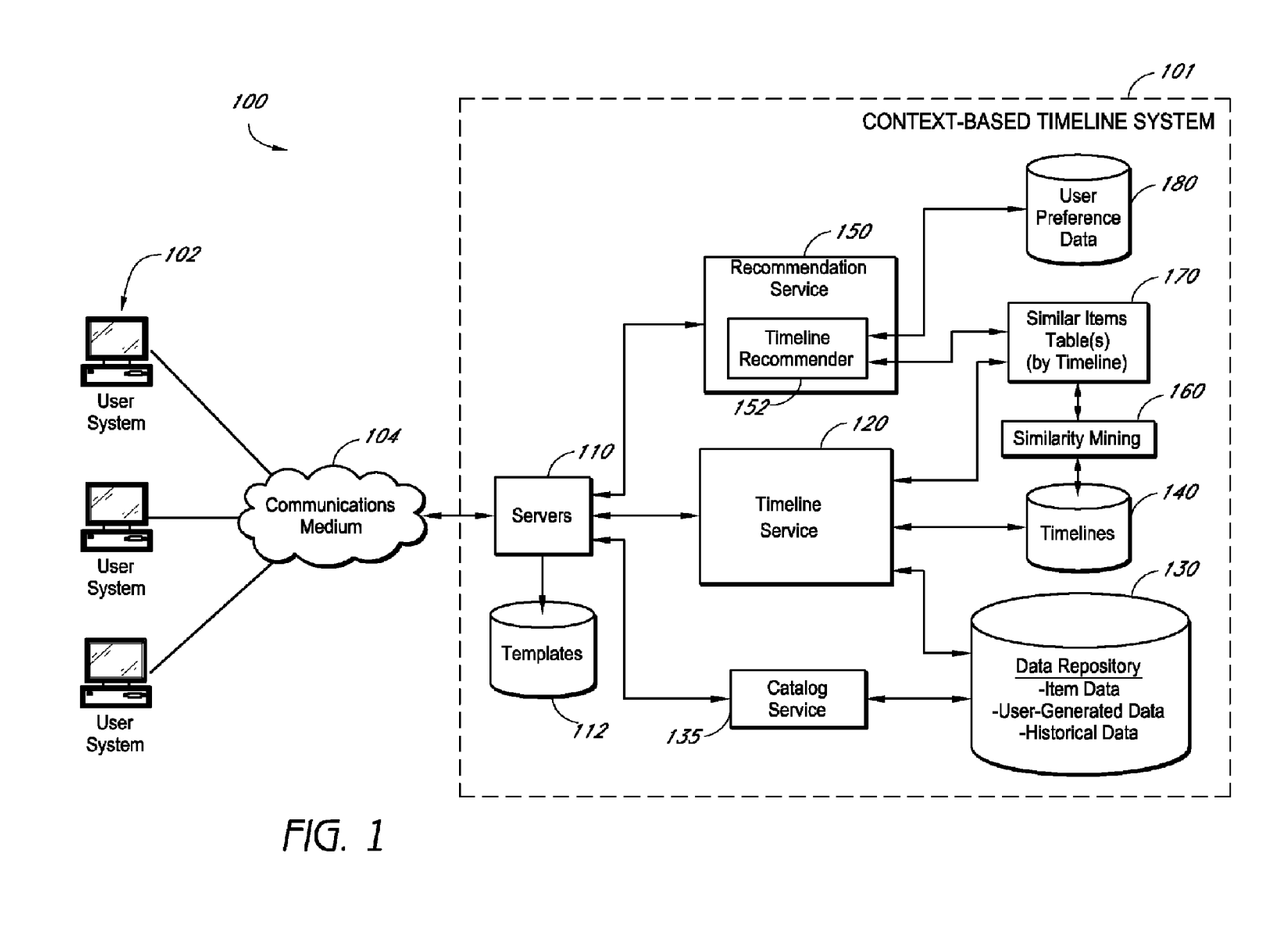
FIG. 1 illustrates an embodiment of a network environment.

Turning to FIG. 1, an embodiment of a network environment 100 for generating context-based timelines is shown. The network environment 100 includes a context-based timeline system 101 that can be implemented using one or more computer systems, such as servers. The context-based timeline system 101 may also be implemented as a network resource, such as a web site or the like. In certain embodiments, the context-based timeline system 101 generates context-based timelines corresponding to target items such as books, movies, television shows, and the like.

The context-based timeline system 101 may be accessed by users via user systems 102. Although shown as personal computers for purposes of illustration, the user systems 102 may include various other types of computing devices, such as web pads, personal digital assistants (PDAs), mobile phones, set-top television boxes, media players, laptop computers, tablets, desktop computers, electronic book readers, kiosks, and the like. The user systems can include various software applications for accessing the content-based timeline system 101, such as browser software applications, stand-alone software applications, plug-ins, interfaces, combinations of the same, and the like.

The context-based timeline system 101 includes one or more servers 110 for communicating with the user systems 102 over a communications medium 104, which may be a network such as the Internet, a local or wide area network (LAN or WAN), intranet, or the like. The servers 110 can be web servers in some embodiments. As web servers, the servers 110 can process Hypertext Transfer Protocol (HTTP) and other protocol requests received over the communications medium 104 from the user systems 102. Additional protocols and components for providing communication between the user systems and servers via the communication medium 104 may be provided in various implementations.

In response to requests from the user system(s) 102, the servers 110 can dynamically generate content by accessing a repository of templates 112, which can include display templates that specify the layout and format of user interface displays such as web pages, widgets, iframes, combinations of the same, and the like. For example, the servers 110 can generate context-based timeline displays, search engine displays, catalog displays, item detail displays, similar items displays, recommendation displays, and the like. The servers 110 can populate these templates with information that may be dependent on the particular user system 102 accessing a template, as may be determined, for example, using browser cookies or a login procedure.

The context-based timeline system 101 includes a timeline service 120, which can be a software component for generating context-based timelines and for presentation to users. The timeline service 120 may also provide a user interface for users to explore items that have similar context-based timelines. The timeline service 120 may be accessed by the user systems 102 through the servers 110.

The timeline service 120 can generate context-based timelines for items by obtaining contextual terms about items from a data repository 130. The contextual terms may be retrieved from data about an item or user-generated data. The contextual terms can correspond to item events that relate to an item, such as may be described in the text of a book or in the text of a user-generated review about the book. The contextual terms may also include themes from theme data related to the item that may not necessarily be described by the item or user-generated data. The theme data may be obtained, for example, from behavioral data regarding related items, categories the item is placed in, and the like. The timeline service 120 can use at least some of the contextual terms to retrieve historical data for the items from the data repository 130. The historical data may include data on historical events. Thus, the timeline service 120 may retrieve historical events that are related to the context of an item. The retrieval of the contextual terms and historical data is described below in greater detail with respect to FIG. 2.

The timeline service 120 may generate a context-based timeline that includes the historical events. The timeline service 120 may also include at least some of the contextual terms on the timeline so that item events described by the item are placed in a visual context with historical events. The timeline service 120 may generate context-based timelines in a variety of forms, such as digital timelines that may be presented on a display to a user or timelines that may be printed out and provided to a user along with a purchased item. Other example forms and configurations of context-based timelines are described below with respect to FIG. 2.

As described above, the timeline service 120 can also provide an interface for users to compare items that have similar timelines. To facilitate user comparisons between similar items, similar items can be detected using a similarity mining module 160. In certain embodiments, the similarity mining module 160 detects similarities between timelines stored in the data repository 140. The similarity mining module 160 can detect these similarities by determining a degree to which timelines' item events and/or historical events overlap. The similarity mining module 160 can assign a degree of similarity between items based at least in part on the degree of similarity between their timelines. The degree of similarity between items can be scored or otherwise weighted.

The similarities and their scores may be stored by the similarity mining module 160 in one or more similar items tables 170. Then, when a user requests to view one or more items that are similar to another item, the timeline service 120 can retrieve one or more similar items from the similar items tables 170. The timeline service 120 may then output a most highly-ranked subset of the similar items, optionally along with their timelines. An example display of similar items and their timelines is described below with respect to FIG. 5.

A recommendation service 150 is also included in the example context-based timeline system 101. The recommendations service 150 includes a timeline recommender 152 that can generate personalized item recommendations for users. To generate recommendations, the timeline recommender 152 may analyze user preference data stored in a data repository 180 to determine, for example, what items the user has viewed or purchased. The timeline recommender 152 may then look up one or more of these purchased or viewed items in the similar items tables 170. The timeline recommender 152 can therefore find items that are similar to the items purchased or viewed by the user, based on the items' respective timelines. Then, the timeline recommender 152 can recommend to a user a subset of the similar items, such as a most-highly ranked subset, based at least in part on their similarity scores.

Figure 2:
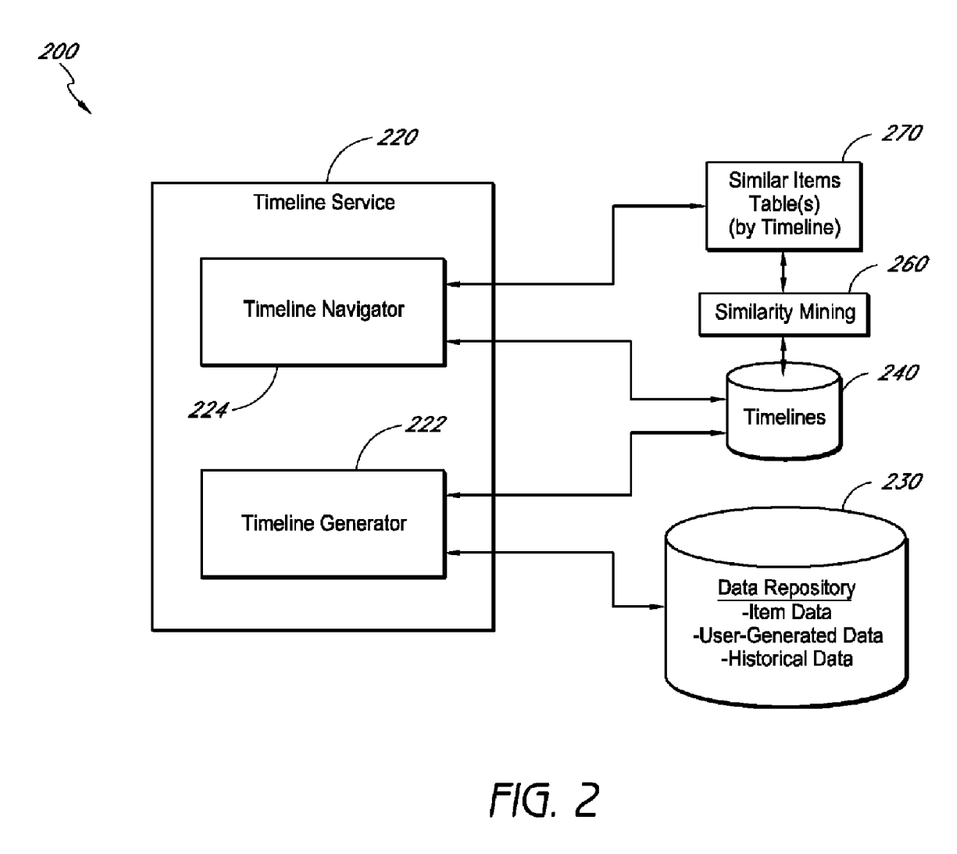
FIG. 2 illustrates an embodiment of a timeline generation system.

FIG. 2 illustrates a more detailed embodiment of a timeline generation system 200 for generating context-based timelines. The timeline generation system 200 can be implemented using one or more computer systems, such as servers. The timeline generation system 200 includes many of the components of the context-based timeline system 100, such as a timeline service 220, a data repository 230, a timeline data repository 240, a similarity mining module 260, and similar items tables 270. These components may have the same or similar functionality as that described above with respect to FIG. 1, as well as additional functionality described below.

The depicted embodiment of the timeline service 220 includes a timeline generator 222 and a timeline navigator 224. The timeline generator 222 can be a software component that generates context-based timelines. The timeline navigator 224 can be a software component that provides a user interface for users to explore similar items and their context-based timelines.

The timeline generator 222 can generate context-based timelines for items by obtaining contextual terms about items from item data, user-generated data and/or theme data. The timeline generator 222 can use at least part of the contextual terms to retrieve historical data for the items. The timeline generator 222 can then generate a timeline using the historical data and also optionally one or more of the contextual terms. The timeline generator 222 can obtain the item data, the user-generated data, and the historical data from the data repository 230. The timeline generator 222 may also perform certain preprocessing steps, which are described below.

The item data may include contextual term information or may be used to identify or generate contextual term information. The data repository 230 shown can be a database or the like that includes item data, user-generated data, and historical data. For ease of illustration, the data repository 230 is shown storing multiple types of data. However, the data of the data repository 230 may be stored in multiple data repositories in other embodiments.

The item data can include metadata of an item. This metadata might include a publisher's description of an item, categories in which the item is placed within a catalog hierarchy, a title of an item, and the like. The item data can also include the information conveyed by an item. In the case of books, for example, the item data can therefore include at least a portion of the actual text of the books.

The user-generated data in the data repository 230 may include any data about the items generated by users. For example, the user-generated data can include written reviews of items, textual tags, plot summaries of items, and the like. In addition, the user-generated data may also include information obtained from web logs (blogs) that may discuss items and information obtained from collaborative discussion sites (such as wikis), forums, and the like that foster discussion about items.

The historical data in the data repository 230 can include information regarding historical events and historical characters, as well as data on dates, places, and the like. For example, the historical data can include information on world events such as scientific discoveries, wars, colonizations, and the like. Example historical characters might include Winston Churchill, Mahatma Gandhi, and Babe Ruth. The historical data may include data for actual and fictional events and/or characters. The events of the historical data may also be associated with dates on which the events occurred.

As mentioned above, the timeline generator 222 may perform certain pre-processing actions prior to generating context-based timelines. For example, the timeline generator 222 can obtain the historical data from online reference works, such as encyclopedias, dictionaries, and the like, and can store the historical data in the data repository 230. To obtain the historical data from online references works, the timeline generator 222 may retrieve text from the online reference works, for example, by crawling the online reference works. The timeline generator 222 may also obtain the historical data from the text of electronic books (e.g., books scanned using optical character recognition software) or from other item data stored in the data repository 230.

The timeline generator 222 may create historical associations between events/characters in the historical data and subject tags representing historical subjects. The timeline generator 222 can initially obtain the subject tags by analyzing the reference works and/or other item data for subject information. The timeline generator 222 may, for instance, access a browse tree of an online encyclopedia to discover subjects and assign each subject a subject tag. Further, the timeline generator 222 can detect historical associations between events/characters described in the online references and the subject tags. The timeline generator 222 can detect these historical associations based on which words representing events,/characters are mentioned in connection with subjects. For example, the timeline generator 222 may determine that events such as the creation of basketball and characters such as James Naismith (the creator of basketball) should be associated with the subject tag "history of sports."

The timeline generator 222 can weight the historical associations between subject tags and words representing events/characters. In one embodiment, the timeline generator 222 weights the associations according to a frequency with which the words are mentioned in connection with the subjects. Thus, if the phrase "NBA Championship" is mentioned more frequently than the phrase "Rugby World Cup" in connection with the subject "American sports," the timeline generator 222 may give a higher weight to the association between "NBA Championship" and "American sports." The historical associations and related weights can be represented as scores, rankings, or the like. The timeline generator 222 may store the historical associations in a data structure, such as one or more database tables in the data repository 230.

While certain actions of the timeline generator 222 have been described above as pre-processing steps, the timeline generator 222 may also perform these actions concurrently while performing other actions. For example, the timeline generator 222 may update the historical data or historical associations in the historical data while concurrently generating context-based timelines. The timeline generator 222 may also perform these pre-processing steps on a periodic or aperiodic basis during off-peak processing times. For example, the timeline generator 222 may update the historical data and historical associations in the historical data once daily.

To generate a context-based timeline, the timeline generator 222 may obtain contextual terms from the data repository 230. The contextual terms can include words and phrases from the item data, user-generated data, and/or theme data that are related to an item. The timeline generator 222 can, for example, mine contextual terms from the electronic text of a book (stored as item data). The timeline generator 222 can use keyword processing algorithms, such as identifying statistically improbable phrases, to mine the contextual terms from a larger body of text. In certain embodiments, the timeline generator 222 can focus on dates or times described in the text. Additionally, the timeline generator 222 can focus on capitalized words in the text. The timeline generator 222 may, for example, select the contextual terms from a sentence, paragraph, or page containing the dates or times.

The timeline generator 222 can also determine the context of the item based on other item data, such as the book's title or categories the book is placed in within an electronic catalog. In another aspect, the timeline generator 222 can determine the context of the item by obtaining contextual terms from the user-generated data. For example, the user-generated data might include textual tags that describe the context of a book or reviews that describe the plot of the book.

The timeline generator 222 can score or rank the contextual terms based on the frequency with which they occur in the item data or user-generated data. In addition, the score or ranking of the terms can depend on their source. For example, a contextual term derived from a category might be ranked more highly than a contextual term derived from a user-generated tag.

To illustrate, the timeline generator 222 might obtain contextual terms from a biography about Henry Kissinger. These contextual terms might include words from the text of the biography, such as "politics," "Vietnam," and so forth. The timeline generator 222 can also obtain further terms from a "U.S. Politics" category that the book is placed in within a catalog hierarchy. The timeline generator 222 can also obtain terms from user-generated data, which might include tags such as "Vietnam," "Cold War," and "President Nixon." If the timeline generator 222 finds duplicate contextual terms, the timeline generator 222 can remove the duplicates prior to conducting further processing.

Using some or all of the contextual terms, the timeline generator 222 can select historical events that are related to the contextual terms from the historical data. The timeline generator 222 may look up each contextual term in the historical data to determine which terms in the historical data match each contextual term. The timeline generator 222 may then identify which subject tags are associated with the matching terms and their respective weightings. In effect, by finding matching terms, the timeline generator 222 can associate the contextual terms with the subject tags. Referring again to the above example, the timeline generator 222 might find that the contextual term "Vietnam" is associated with subject tags such as "Southeast Asian Countries," "20th Century Wars," "Rice Exporting Countries."

The timeline generator 222 may select at least a subset of the subject tags. For each selected subject tag, the timeline generator 222 can select historical events/characters associated with the selected subject tags, based on their weightings. Referring again to the example above, various historical events and/or characters associated with the subject tag "20th Century Wars," such as "the Vietnam War," "Douglas MacArthur," and so on might be selected based on their weightings. In certain embodiments, the timeline generator 222 assembles a data structure of the events/characters and their respective weightings.

The timeline generator 222 may, in some cases, exclude certain subject tags and/or historical events/characters from being associated with the contextual terms. For example, even though characters such as "Babe Ruth" in the subject tag "20th Century Historical Figures" may be associated with "Henry Kissinger," the timeline generator 222 can exclude all historical events/characters that are not related, for example, to the subject tag "Foreign Affairs." Or, the timeline generator 222 may exclude specific subject tags, such as "Sports."

The timeline generator 222 can use the weightings of the historical associations between the contextual terms and subject tags to rank the selected historical events. From this ranking, the timeline generator 222 can select a subset of the retrieved historical events to include on the context-based timeline. The timeline generator 222 can then build the context-based timeline by ordering the subset of historical events chronologically based on dates associated with the historical events. If no or few historical associations are found based on the contextual terms, a pre-generated set of historical events may be provided for the item's context-based timeline. The pre-generated set of historical events might include significant events of the 20th century, for example.

In one embodiment, the timeline generator 222 can allow a user to control the granularity of historical events displayed on the context-based timeline. For example, the timeline generator 222 can provide a user interface control that enables a user to request additional details of a specific period of time on the context-based timeline, such as the 1960s. The user interface control may be a "zoom" control or the like that allows the user to selectively view fewer or more details. In response to the user request, the timeline generator 222 might include events on the context-based timeline that have successively lower rankings as the user requests additional details to be shown.

The timeline generator 222 may also incorporate item events described by an item into the context-based timeline. These item events can include events that occurred in the story or description of the item. For example, item events in a biography might include certain events of an individual's life described in the biography. The item events might instead include the titles of one or more chapters in a book. The timeline generator 222 may obtain the item events from the contextual terms, for example, by identifying statistically improbable phrases, counting the frequency of those phrases in the text, and selecting most-frequently occurring phrases as item events. In addition, the timeline generator 222 can identify item events based at least in part on capitalized terms in the text. Examples of item events are illustrated below with respect to FIG. 5.

The timeline generator 222 can place the item events in the context-based timeline alongside the historical events. The timeline generator 222 can list the item events chronologically on the timeline. The timeline generator 222 may adjust the size, color, font, presentation, or the like of selected item and/or historical events to selectively indicate possible relevance of the events. For example, if an event is obtained from a blog entry from an unknown user, the event may appear on the timeline with a different color, font, or different size than other events. A single context-based timeline can also be generated for multiple items, such as a set of books in the trilogy. In addition, the context-based timelines can be vertical or horizontal or a combination thereof.

The timeline generator 222 can generate electronic timelines in a variety of forms. For example, the electronic timelines can be vertical or horizontal or a combination thereof. The timeline generator 222 can output the timeline for display to a user upon a user's request to view a timeline for an item. The timeline generator 222 can also be used to print timelines and include them with items shipped to users. In another embodiment, the timeline generator 222 can generate collaborative discussion pages such as "wikis" that allow users to edit electronic timelines generated initially by the timeline generator 222. Moreover, an application programming interface (API) may be provided for users to use for uploading timelines to the timeline service 220. The timeline generator may also store the electronic timelines in a data repository 240.

As mentioned above, the timeline navigator 224 can provide users with access to the context-based timelines stored in the data repository 240. For example, while a user is browsing items in an electronic catalog using a catalog service 235 or the like, the user might wish to view a context-based timeline of an item. In response to a timeline view request from a user, the timeline navigator 224 can access the timeline from the repository 240 and output the timeline for display to the user. In addition, in certain embodiments, users may use the timeline navigator 224 to compare items based on their timelines. For example, users may compare timelines of two different items to get a sense of similarities and differences between those items. Users can compare timelines of different types of items, such as books and movies or music and television shows.

Users may also compare an item's timeline against a master timeline. In certain embodiments, the timeline generator 222 can generate master timelines that include a set of historical events derived from the historical data but that are not based on the context of an item. Master timelines may also be manually generated. An example of a master timeline might include a timeline of major events in the 1970s. Users may overlap or merge context-based timelines with master timelines. Users may also overlap or merge similar timelines. Merging timelines may facilitate comparisons between timelines or items. In one embodiment, when timelines are merged together, events from each timeline may be displayed differently, such as with different colors.

In other embodiments, the timeline navigator 224 can present a user interface that allows a user to select items based on a date or date range, one or more characters, historical events, categories, combinations of the same, or the like. As one example, a user might wish to view books in a category of music history that cover a date range of 1800 to 1850. In response to the user's selection, the timeline navigator 224 can retrieve items whose timelines include events that correspond to the user's selection.

In addition, as described above with respect to FIG. 1, the timeline navigator 224 can provide a user interface for comparing items having similar timelines. For example, the timeline navigator 224 can retrieve similar items from the similar items table or tables 270. The similarities between these similar items may be detected by the similarity minding module 260. An example of a user interface for exploring similar items and context-based timelines is described below with respect to FIG. 5.

Figure 3:
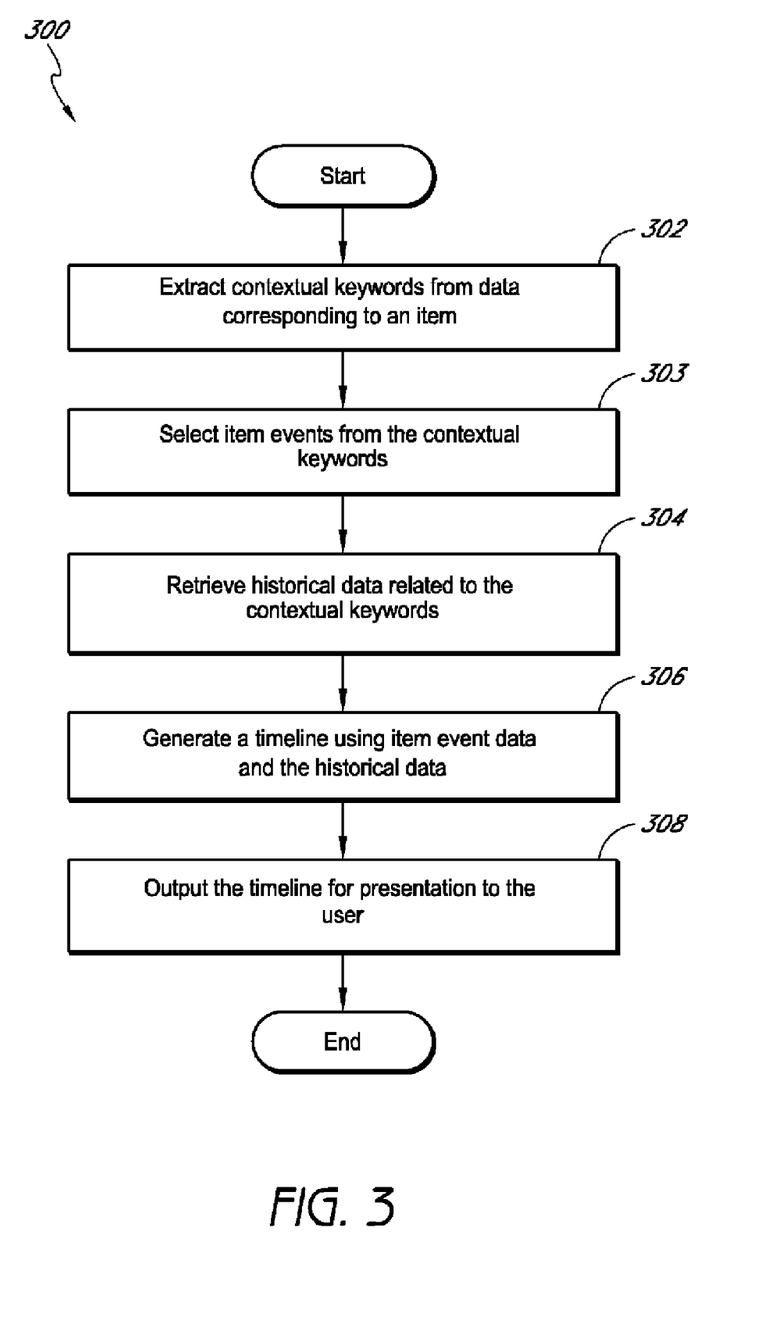
FIG. 3 illustrates an embodiment of a process for generating context-based timelines.

FIG. 3 illustrates an embodiment of a timeline generation process 300 for generating context-based timelines. The timeline generation process 300 can be implemented by the context-based timeline system 101 or the timeline generation system 200 described above. In particular, in certain embodiments the timeline service 120 or the timeline generator 222 can implement the process 300. The timeline generation process 300 can generate timelines to help users place items such as books, movies, television shows, and the like in context.

At block 302, contextual terms can be extracted from data corresponding to an item. The contextual terms can include words and phrases from item data and/or from user-generated data related to the item. The contextual terms can also include the name of a category that an item is placed in within an electronic catalog. In addition, item events can be selected from the contextual terms at block 303. The item events can include events that are described by the item, such as in the text of the item.

At block 304, historical data related to the contextual terms can be retrieved. The historical data can include information regarding historical events, historical characters, as well as data on dates, places, and the like. A timeline may then be generated at block 306 using the item events and the historical data. The timeline may include a graphical representation of the item events and the historical data. As one example, item events may be interspersed with historical events on a single timeline. As another example, separate timelines can be created for item events and historical events. The timeline may be a single line with events and dates listed alongside the line, or the line can be more complex, with different colors indicating item events and historical events. In some embodiments, item events are not included on the timeline. Many variations on the graphical configuration of the timelines may also be used.

At block 308, the timeline may be output for presentation to the user. The timeline can be provided to the user electronically, such as on a network resource (e.g., web page), on a collaborative discussion (e.g., wiki) page, or the like. The timelines can be provided upon user request or may be automatically provided when a user selects an item for viewing. In another embodiment, the timeline can also be provided as a printout, which may be delivered along with the item to the user. In another embodiment, the timeline can be delivered electronically to the user on an electronic book computer system.

Figure 4:
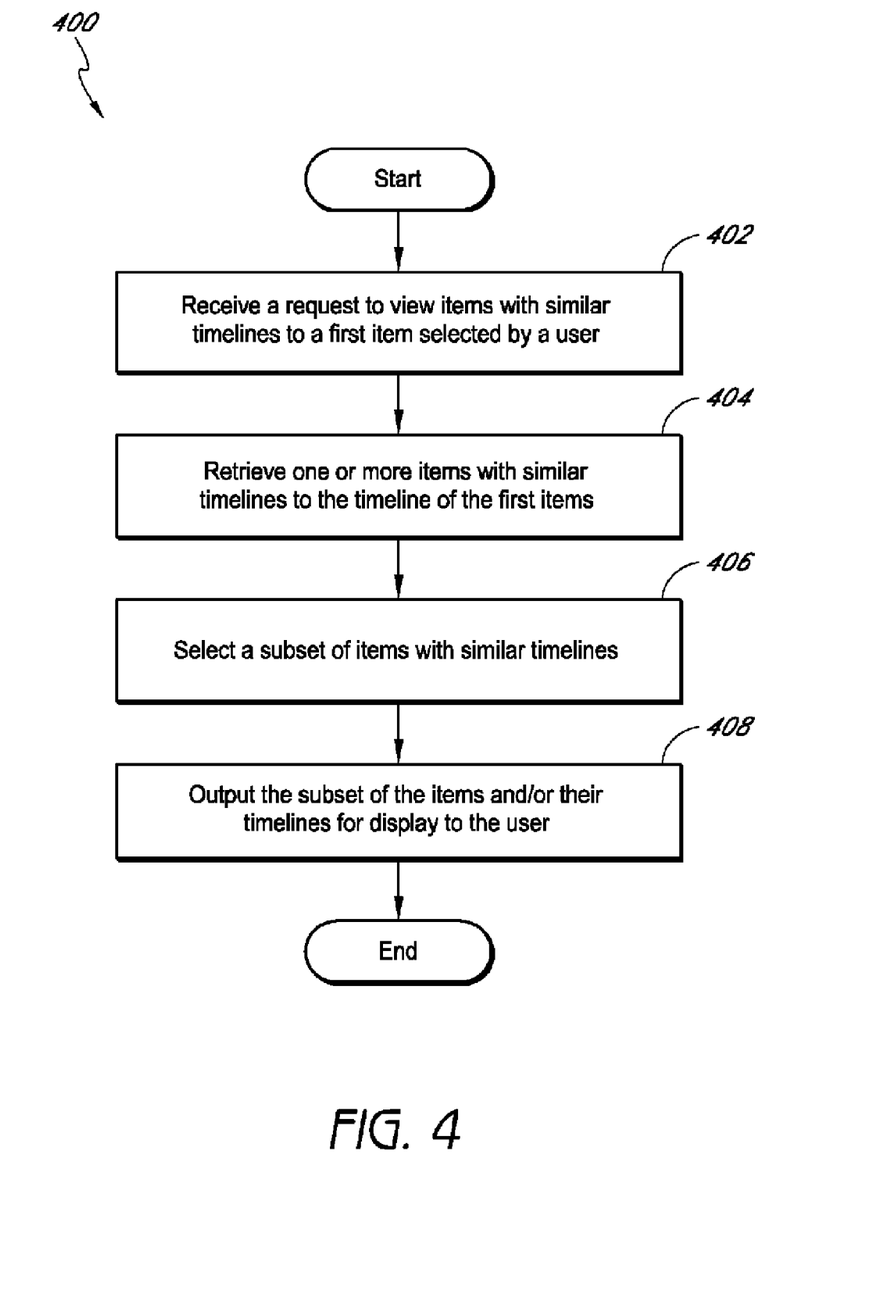
FIG. 4 illustrates an embodiment of a process for navigating similar items.

FIG. 4 illustrates an embodiment of an item navigation process 400 for navigating similar items. The item navigation process 400 can be implemented by the context-based timeline system 101 or the timeline generation system 200 described above described above. In particular, in certain embodiments the timeline service 120 or the timeline navigator 224 can implement certain blocks of the process 400.

A request to view items with similar timelines to a first item selected by a user can be received at block 402. The user may initiate the request indirectly by selecting an item. Alternatively, the user may directly request a context-based timeline by selecting a timeline user interface control, which may be a button, hyperlink, or the like.

At block 404, one or more similar items with similar timelines to the timeline of the first items can be retrieved. For example, the similar items may be retrieved from pre-generated similar items data. The similar items data may be generated in a separate process from the process 400. In an embodiment, the similar items data is generated by comparing the timelines of items to determine which timelines are similar with other timelines. Pairs of items that have relatively more similarities between timelines may be considered to be more similar than pairs of items with relatively fewer similarities between timelines. The generation of similar items data may be performed by the similarities mining module 160 or 260.

A subset of items with similar timelines can be selected at block 406, and the subset of items may be output for display to the user at block 408. The subset of items may include one or more items with similar timelines. The one or more similar items may be displayed with or without their corresponding timelines.

Figure 5:
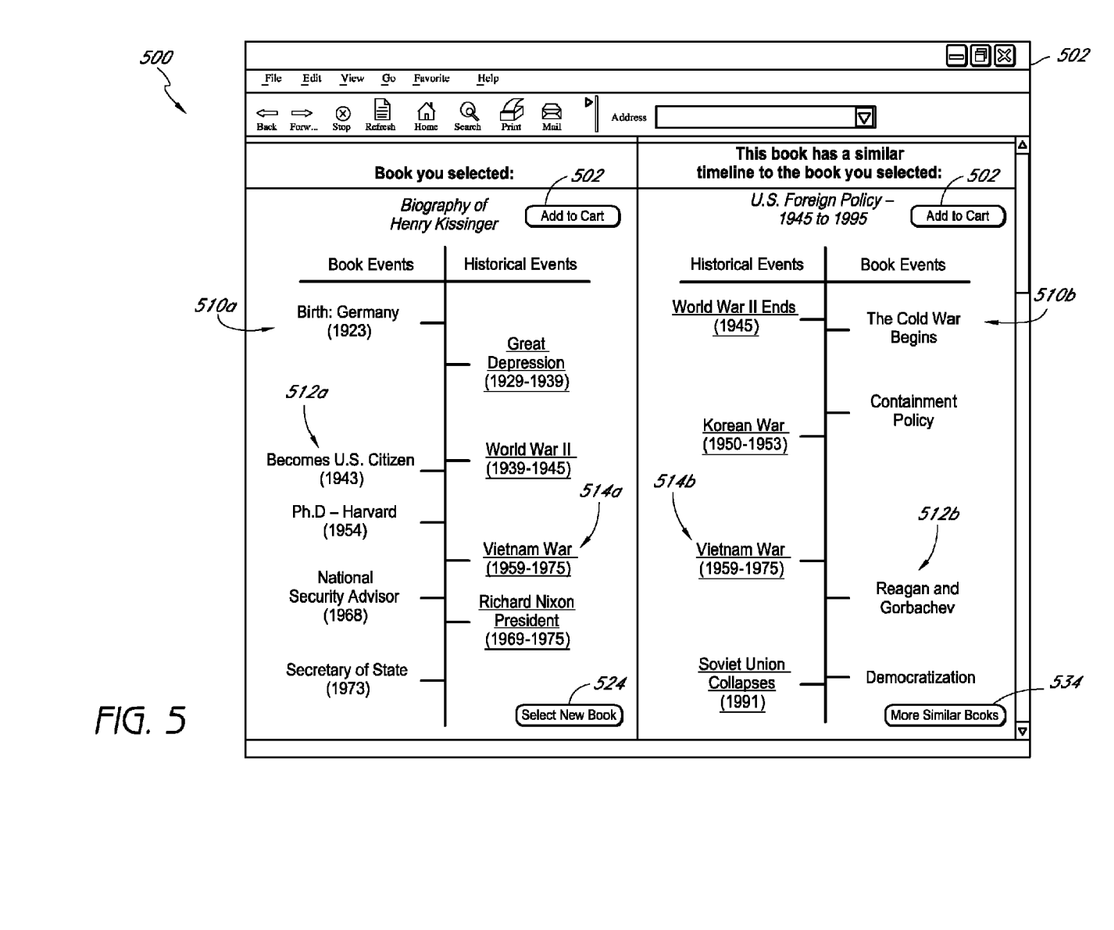
FIG. 5 illustrates an embodiment of a graphical user interface showing example context-based timelines.

FIG. 5 illustrates an example context-based timeline display 500. The context-based timeline display 500 can be generated by the context-based timeline system 101 described above. In particular, in one embodiment, the context-based timeline display 500 may be generated by the timeline service 120. The context-based timeline display 500, in various implementations, can provide users with an interface to explore similar items based on the relatedness of items' context-based timelines.

For purposes of illustration, the context-based timeline display 500 is shown as a graphical user interface in a web browser 502. The context-based timeline display 500 could instead be displayed within a separate application from a browser. In addition, while an example layout of the context-based timeline display 500 is shown, the layout may be varied substantially in various embodiments.

The context-based timeline display 500 illustrates two timelines 510, namely a first timeline 510a for a book selected by a user, and a second timeline 510b for a similar book with a similar timeline 510. The timeline 510a is for a book entitled "*Biography of Henry Kissinger*," and the timeline 510b is for a book entitled "*U.S. Foreign Policy*—1945 to 1995." The timeline 510a includes book events 512a, which are item events derived from data about the "*Biography of Henry Kissinger*" book. The book events 512a include events in Henry Kissinger's life, such as his birth, his becoming a U.S. citizen, and so on. The timeline 510b also includes book events 512b. However, the book events 512b are the titles of chapters within the "*U.S. Foreign Policy*" book. These example chapters include "The Cold War Begins," "Containment Policy," and so on. The choice of using chapters as the book events 512b is for illustrative purposes only; each of the timelines 510a might show the same or different types of book events 512 in other embodiments.

Historical events 514 are also included on each timeline 510. The historical events shown are associated with the book events 512 to create the timeline 510 for each book. As described above, these historical events 512 may be chosen based on their degree of association with the book or item events 512. Thus, in the example display 500 shown, the timeline 510a includes certain historical events from the 20th century that correspond to Henry Kissinger's lifetime, including the "Great Depression," "World War II," and the "Vietnam War." Similarly, the timeline 510b includes historical events 514b that correspond to the book events 512b.

Other user interface controls are provided in the depicted embodiment, including "Add to Cart" buttons 504 that allow a user to purchase a displayed book. Next to the timeline 510, a button 524 labeled "Select New Book" allows a user to browse for other books. In addition, a "More Similar Books" button 534 allows a user to browse for other books that are similar to one or both of the books shown.

In the depicted embodiment, the historical events 514 are underlined, indicating that the historical events 514 represent hyperlinks to other documents. In certain embodiments, these historical event hyperlinks, when selected, can cause a separate document or display to be retrieved. This separate document or display may contain additional information about the selected historical event. The document or display provided might be a page of an online reference work such as an encyclopedia. Alternatively, selecting a historical event hyperlink can cause a search for items to be performed in a search engine using the words of the historical event. Upon completion of the search, the search results may be provided to a user.

The example display 500 illustrates one possible configuration for comparing similar items, such as books. The display 500 may be varied in many ways. For instance, the display 500 could include more than two books. The display 500 could also superimpose the timelines 510 upon each other. The timelines 510 might be displayed horizontally in other embodiments. In addition, while timelines 510 for books are shown, other items may be compared based on timelines 510. As described above, movies, television shows, magazines, video games, music, and other items may be compared based on their timelines 510. Moreover, different types of items may be compared based on their timelines 510; for example, books may be compared to movies, and movies may be compared to video games. Many other configurations are possible in various embodiments.

Figure 6A:
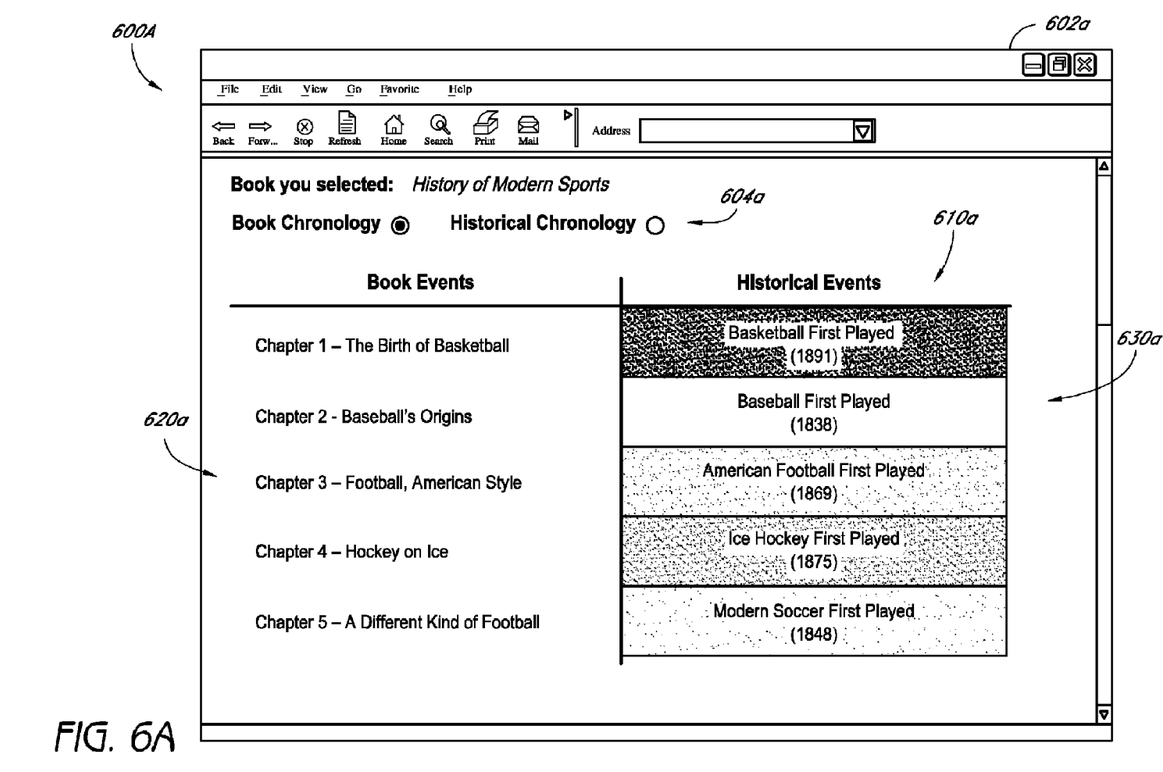
FIGS. 6A and 6B illustrate additional embodiments of graphical user interfaces showing example context-based timelines.
Figure 6B:
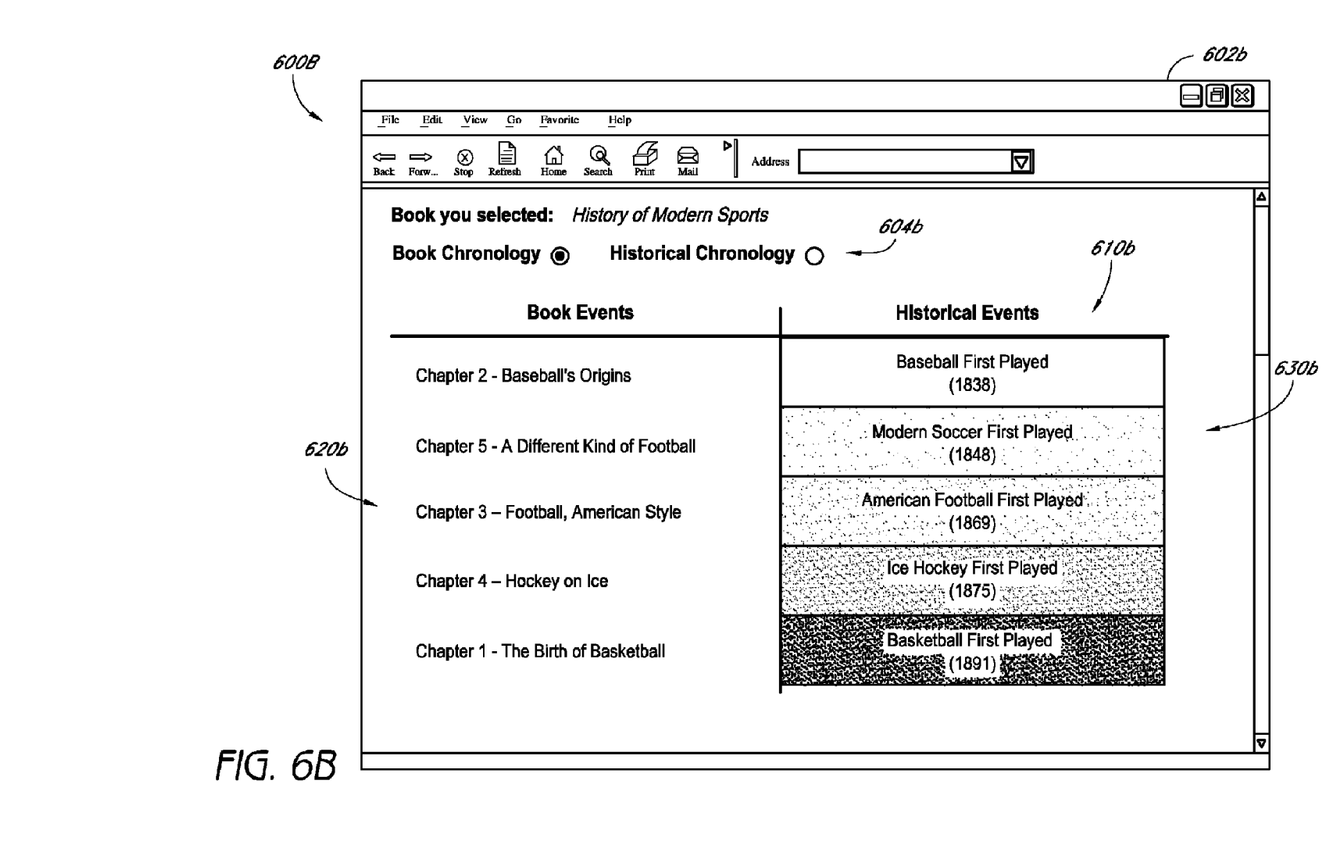

FIGS. 6A and 6B illustrate additional example context-based timeline displays 600A and 600B, respectively. The context-based timeline displays 600 can be generated by the context-based timeline system 101 described above. In particular, in one embodiment, the context-based timeline displays 600 may be generated by the timeline service 120. The context-based timeline displays 600, in various implementations, can provide users with interfaces for adjusting timelines based on both book and historical event chronologies. While the context-based timeline displays 600 are shown as graphical user interfaces in a web browser 602a, 602b, other applications could be used to output the displays 600 in other embodiments.

The context-based timeline displays 600 illustrate timelines 610, including a first timeline 610a (FIG. 6A) and a second timeline 610b (FIG. 6B). The timelines 610 both correspond to the same book, a book entitled "*History of Modern Sports*." In addition, chronology controls 604 are provided for adjusting the chronological ordering of the timelines 610. The chronological controls 604 are radio buttons in the depicted embodiment. The chronological controls 604 may be selected by a user to view the timelines 610 based on the chronological order of book events 620a or based on ordering of related historical 630a events.

In FIG. 6A, the radio button of the chronology controls 604a next to "Book Chronology" is selected. Thus, the timeline 610a is ordered according to the book events 620a. In the depicted embodiment, the book events 620a are the chapters of the book. The historical events 630a, on the other hand, are not listed in chronological order, as may be the case with many books. A user may, however, wish to see how the book events 620a correspond to chronological ordering of historical events 630a. To illustrate this different ordering, a user may select the radio button of the chronological controls 604a next to "Historical Chronology." One possible effect of such a user action is illustrated in FIG. 6B, where the timeline 610b is ordered based on historical events 630b.

The historical events 630a, 630b are shaded based on their chronological ordering, so as to facilitate a reader's understanding of the ordering of historical events 630. Events 630 occurring earlier in time are shaded more lightly than events 630 occurring later in time. In other embodiments, colors may be used instead of shading. For example, earlier historical events 630 may be depicted in a green color, and later historical events 630 may be depicted as red. Intervening historical events 630 may have colors that are in-between green and red, with later events being increasingly redder. However, the colors and shadings described herein are merely illustrative; many other colors, shadings, and/or combinations thereof may be used in other embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Each of the processes, components, and algorithms described above may be embodied in, and fully automated by, code modules executed by one or more computers or computer processors. The code modules may be stored on any type of computer-readable medium or computer storage device. The processes and algorithms may also be implemented partially or wholly in application-specific circuitry. The results of the disclosed processes and process steps may be stored, persistently or otherwise, in any type of computer storage. In one embodiment, the code modules may be configured to execute on one or more processors, including sub-processors. In addition, the code modules may comprise, but are not limited to, any of the following: software or hardware components such as software object-oriented software components, class components and task components, processes methods, functions, attributes, procedures, subroutines, segments of program code, drivers, firmware, microcode, circuitry, data, databases, data structures, tables, arrays, variables, combinations of the same, and the like.

The various features and processes described above may be used independently of one another, or may be combined in various ways. All possible combinations and subcombinations are intended to fall within the scope of this disclosure. In addition, certain method or process steps may be omitted in some implementations.

While certain embodiments of the inventions disclosed herein have been described, these embodiments have been presented by way of example only, and are not intended to limit the scope of the inventions disclosed herein. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for generating timelines of events from publications, the system comprising:
   a timeline generator comprising computer hardware, the timeline generator configured to, for each of a plurality of publications represented in an electronic catalog:
   extract contextual terms from text of the publication, select item events from the contextual terms, the item events comprising data on events described in the publication, use the contextual terms to retrieve historical data from a data repository, the historical data being associated with at least some of the contextual terms in the data repository, and generate a context-based timeline comprising at least some of the historical events and at least some of the events described in the publication;

a timeline data repository configured to store the context-based timeline generated for each of the publications by the timeline generator;

a similarity mining module configured to detect similarities between the publications by at least detecting overlap between timelines of the publications to produce similarities data; and a timeline recommender configured to provide personalized publication recommendations to a user by at least: identifying a selected one of the publications that was selected by the user, identifying first publications of the publications that are similar to the selected publication from the similarities data, and outputting the first publications as the personalized publication recommendations for presentation to the user.

2. The system of claim 1, wherein the timeline generator is further configured to pre-generate associations between the historical data and the contextual terms.

3. The system of claim 2, wherein the timeline generator is further configured to pre-generate the associations by generating weighted associations between the contextual terms and the historical data.

4. The system of claim 3, wherein the timeline generator is further configured to pre-generate the associations by accessing one or more online reference sources.

5. The system of claim 1, wherein the context-based timeline further comprises a hyperlink for each historical event, each hyperlink configured to provide the user with details on the historical event in response to selection of the hyperlink.

6. The system of claim 1, wherein the timeline generator is further configured to extract contextual terms from user-generated data.

7. The system of claim 6, wherein the user-generated data comprises one or more of the following: user-generated reviews and textual tags.

8. A method for generating context-based timelines corresponding to items in an electronic catalog, the method comprising:

by a computer system comprising computer hardware:

for each of a plurality of items represented in an electronic catalog:

extracting contextual terms and item events corresponding to the item, the item events comprising data on item events related to the item;

using the contextual terms to retrieve historical data from a data repository, the historical data comprising data on one or more historical events, the historical data being associated with at least some of the contextual terms;

generating a context-based timeline for each of the items, the timeline comprising at least some of the one or more historical events;

detecting similarities between the items by at least detecting overlap between the timelines of the items to produce similarities data; and providing personalized item recommendations for a user by at least: identifying a selected one of the items that was selected by the user, identifying first items of the items that are similar to the selected item from the similarities data, and outputting the first items as the personalized item recommendations for presentation to the user.

9. The method of claim 8, wherein the generating of the context-based timeline further comprises including at least some of the item events in the context-based timeline.

10. The method of claim 8, wherein the item comprises a book, a movie, or a television show.

11. The method of claim 10, wherein the item events comprise item events described in the book.

12. The method of claim 10, wherein the item events comprise data on characters described in the book.

13. The method of claim 8, wherein extracting the contextual terms comprises extracting the contextual terms from text of the item.

14. The method of claim 8, wherein extracting the contextual terms comprises extracting the contextual terms from user-generated data.

15. The method of claim 14, wherein the user-generated data comprises tag data.

16. The method of claim 8, wherein the context-based timeline is configured to be edited by one or more users.

17. The method of claim 8, further comprising outputting a user interface control configured to zoom into the context-based timeline.

18. The method of claim 8, further comprising outputting a user interface control configured to reorder a chronology of the context-based timeline based on chronological order of the one or more historical events.

* * * * *